United States Patent [19]

Sano et al.

[11] 4,433,230
[45] Feb. 21, 1984

[54] METHOD OF MANUFACTURING A VACUUM VESSEL PROVIDED WITH A RADIATION-PERMEABLE WINDOW

[75] Inventors: Tetsu Sano, Tokyo; Takezou Yasuzuka; Hisao Ishiwata, both of Yokohama; Tatsuo Simizu, Kawasaki, all of Japan

[73] Assignee: Tokyo Shibaura Denki Kabushiki Kaisha, Kawasaki, Japan

[21] Appl. No.: 270,214

[22] Filed: Jun. 3, 1981

[30] Foreign Application Priority Data

Jun. 5, 1980 [JP] Japan .................................. 55-74945

[51] Int. Cl.³ .............................................. B23K 11/20
[52] U.S. Cl. .................................... 219/118; 219/91.2; 228/263.21
[58] Field of Search ................ 219/91.2, 94, 118, 111, 219/85 CA; 228/263 E, 263 J, 263.16, 263.21

[56] References Cited

U.S. PATENT DOCUMENTS 3,038,988 6/1962 Kessler et al. ...................... 219/91.2
3,878,417 4/1975 Eberlein ................................ 313/59

FOREIGN PATENT DOCUMENTS 1439639 1/1969 Fed. Rep. of Germany .
2234655 1/1975 France .
741737 12/1955 United Kingdom .
741736 12/1955 United Kingdom .
788589 1/1958 United Kingdom .
867917 5/1961 United Kingdom .
210972 6/1968 U.S.S.R. .............................. 219/118

OTHER PUBLICATIONS

American Society for Metals, Metals Handbook, 8th Edition, vol. 6–Welding and Brazing, 1971, pp. 413,419–421.

Primary Examiner—B. A. Reynolds
Assistant Examiner—Alfred S. Keve
Attorney, Agent, or Firm—Cushman, Darby & Cushman

[57] ABSTRACT

A vacuum vessel, used for such as an X-ray image intensifier, is provided with a radiation-permeable window member prepared from titanium or alloys thereof. The window member is supported on a support frame of iron or alloys thereof by resistance welding. A method of manufacturing the vacuum vessel comprises the steps of: successively spot welding the periphery of the window member by resistive heating to a support frame made of iron or alloys thereof with a pressure of 40–200 kg/cm² while interposing a metal foil insert member having a lower melting point than the transformation point of the window member between the window member and the support frame; and hermetically sealing the periphery of the window member in the support frame.

4 Claims, 9 Drawing Figures

METHOD OF MANUFACTURING A VACUUM VESSEL PROVIDED WITH A RADIATION-PERMEABLE WINDOW

This invention relates to a vacuum vessel provided with a radiation-permeable window such as an X-ray image intensifier, X-ray tube, radiation detector, betatron envelope and similar vacuum vessels provided with a radiation-permeable window and a method of manufacturing the same.

The above-mentioned type of vacuum vessel is provided with a radiation-permeable window and has an airtight construction in order to maintain the interior at vacuum or fill it with an atmosphere of a prescribed gas. For example, in an X-ray image intensifier, a large window member of 150 to 400 mm diameter for transmitting X-rays modulated while passing through an object has a tendency to be formed of aluminum (Al) or titanium (Ti) instead of a glass plate which absorbs or scatters X-rays to a relatively noticeable extent. In an X-ray tube in which the central portion of a vacuum vessel is formed of a metal, an X-ray transmitting window has to be provided in the close proximity of an anode target heated highly and emitting secondary electrons easily. Therefore, this X-ray transmitting window should be prepared from a material prominently resistant to high temperature. Titanium or alloy thereof (hereinafter simply referred to as "Ti material") proves practically useful as a metal material which little tends to absorb or scatter radiation under the aforementioned conditions. The above-mentioned type of vacuum vessel has to be provided with an insulator of such as glass or ceramic material for the purpose of supporting various internal electrodes, piercing leads through the vacuum vessel outside or getting a visible optical image from the outside of the vacuum vessel. It is practically rare in consideration of, for example, cost that the vacuum vessel is wholly made of Ti material alone, even where the aforesaid insulator is not applied. The conventional process of manufacturing the above-mentioned type of vacuum vessel comprises hermetically sealing the Ti material with any other metal member in at least one portion of the vacuum vessel. This metal member is often formed of any selected from the group consisting of Kovar (trademark), stainless steel, material of high magnetic permeability such as iron (Fe) and alloys of iron (hereinafter referred to as "Fe material") which can be stably sealed with glass or ceramics.

The process of sealing the Ti material with the Fe material in airtightness is already set forth in the British Pat. No. 2,006,518 or U.S. Pat. No. 3,878,417 (Eberlein). The sealing process disclosed in the former patent comprises sealing a thin sheet of Ti material with a thick support frame made of, for example, iron-nickel-cobalt alloy, chromium-nickel steel or molybdenum by arc or spot welding or soldering. The sealing process disclosed in the latter patent comprises welding the outer peripheral edge portion of a support frame with a thin Ti material inserted within. Apart from the above-mentioned sealing processes, the conventional process of sealing the Ti material with stainless steel has been effected mainly by brazing. This brazing process which is intended to provide an alloy of Ti-Ni or Ti-Cu comprises inserting a foil of Ni or Cu between a sheet of Ti material and a sheet of stainless steel, and heating to a temperature of about 950°±10° C. Another widely accepted process of brazing Ti material with stainless steel comprises applying a brazing material of the silver (Ag) or silver alloys and producing a eutectic structure by heating to a temperature of about 980° to 955° C. In this case, it is also found effective to plate a sheet of the Ti material with a layer of Ni.

Where, however, experiments were made with the Ti material-stainless steel welding process set forth in the British Pat. No. 2,006,518, then it was found that the thinner the Ti material used, the greater the tendency of the welded spots of the Ti material to be brittle, failing to provide good airtight welding all along the periphery of the sealed mass. The welding process described in the British patent in which the requisite conditions for assuring a stable sealed state were extremely limited was found unacceptable from the industrial point of view. Further, experiments were made with the conventional brazing process which applied the brazing material of Ag or a foil of Ni or Cu as an insert. With this prior art brazing process, however, the Ti material which was exposed to a high temperature as 950° to 995° C. became brittle as a whole. Further, the thinner the Ti material used, the greater its tendency to be deformed due to a difference between its thermal expansion coefficient and that of the supporting frame. Therefore, this prior art brazing process was also found unadapted for practical application. The reason for this drawback is supposed to be that the brazing material was fused for sealing at a higher temperature than about 900° to 950° C., namely, a transformation point at which the Ti material was recrystallized, giving rise to the prominent brittleness and deformation of the Ti material.

It is accordingly the object of this invention to provide a vacuum vessel provided with a radiation-permeable window, in which the Ti material used as a radiation-permeable window member is saved from brittleness and deformation and which assures great sealed strength and high airtightness.

Another object of the invention is to provide a method of manufacturing a vacuum vessel provided with a radiation-permeable window in which the Ti material used as a radiation-permeable window member is saved from brittleness and deformation, and which assures great bonded strength and high airtightness, and offers great advantage in industrial manufacture.

In other words, this invention provides a vacuum vessel provided with a radiation-permeable window which comprises a radiation-permeable window member of titanium or alloys thereof and a support frame constructed by hermetically sealing iron or alloys thereof to the outer peripheral portion of said window member, and is characterized in that a metal foil insert member fusible at a lower temperature than the transformation point of the window member is disposed between the outer peripheral portion of the window member and support frame, and the whole mass is sealed together in airtightness by spot welding based on resistive heating.

A further object of the invention is to provide a method of manufacturing a vacuum vessel provided with a radiation-permeable window which characteristically comprises the steps of:

superposing a radiation-permeable window member prepared from titanium or alloys thereof, support frame formed of iron or alloys thereof and metal foil insert member fusible at a lower temperature than the transformation point of the window member, with said insert member held between said window member and support frame;

holding the superposed mass between a pair of electrodes for effecting spot welding based on resistive heating;

conducting pulse current across the paired electrodes pressed against the superposed mass with a pressure of 40 to 200 kg/cm$^2$, to bond together the window member and support frame; and carrying out the spot welding successively in such a manner that the welded portions are rendered contiguous along the periphery of the window member.

This invention can be more fully understood from the following detailed description when taken in conjunction with the accompanying drawings, in which.

Description is now given with reference to the accompanying drawings of a vacuum vessel embodying this invention. Throughout the drawings, the same parts are denoted by the same reference numerals.

Figure 1:
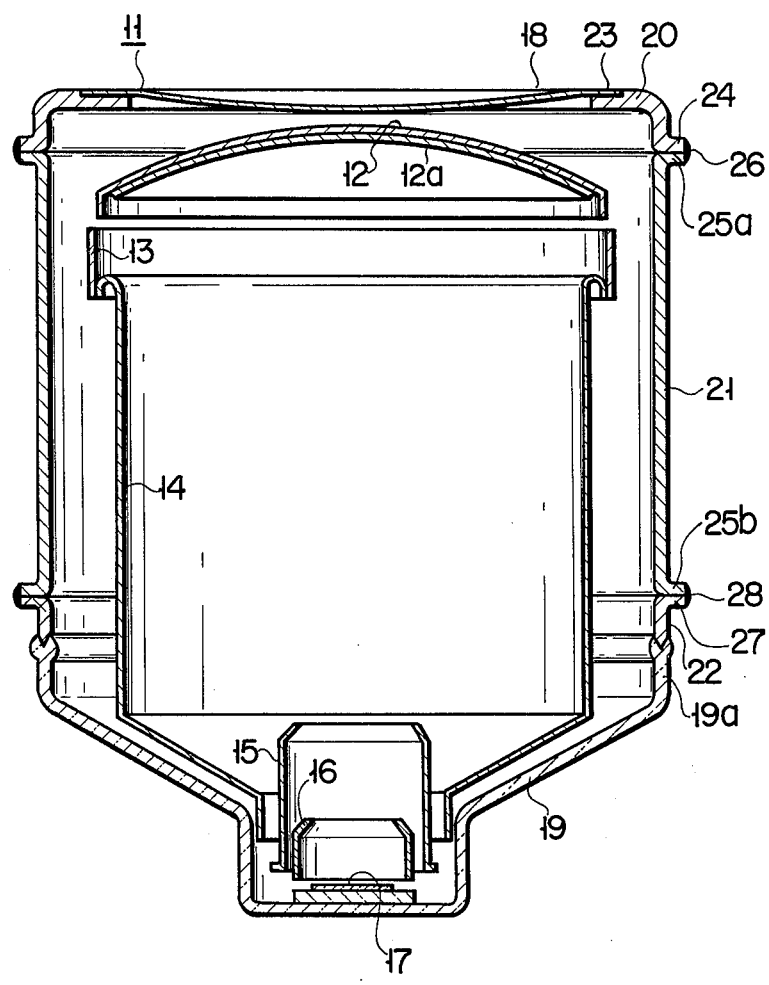
FIG. 1 is a cross sectional view of an X-ray image intensifier provided with a vacuum vessel embodying this invention.

FIGS. 1 to 4 indicate an X-ray image intensifier provided with a vacuum vessel according to one embodiment of this invention. This X-ray image intensifier is constructed by arranging in a vacuum vessel 11 a spherical input substrate 12 provided with an input screen 12a comprising a fluorescent layer formed of, for example, cesium iodide (CsI) and a photoelectric cathode layer, a plurality of electrodes i.e. first cylindrical grid 13, second grid 14, third grid 15, anode 16, and output fluorescent layer 17. The vacuum vessel 11 itself comprises an X-ray input window member 18 prepared from the Ti material which is permeable to X-rays introduced from the upper section of FIG. 1 and allows the X-rays to be transmitted to the input substrate 12; an output glass vessel 19 which conducts a visible optical image issued from the output fluorescent layer 17 to the outside of the X-ray image intensifier; and a group of a ring-shaped support frame 20, body cylinder 21, and glass sealing ring 22 made of, for example, Kovar which are closely arranged in a space defined between the input window member 18 and output glass vessel 19 in the order mentioned as counted from above. The periphery of the input window member 18 is welded in airtightness to that of support frame 20 in a position indicated by a reference numeral 23. A flange 24 formed by outward bending part of support frame 20 and a flange 25a formed by outward bending part of body cylinder 21 are welded together in airtightness by inert gas arc welding in a position indicated by a reference numeral 26. The open end portion 19a of output glass vessel 19 is previously sealed to the Kovar ring 22. After the internal electrodes of the X-ray image intensifier are assembled, the lower flange 25b of the body cylinder 21 and the flange 27 of the Kovar ring 22 are welded together similarly by the inert gas arc welding in a position indicated by a reference numeral 28. Thus, the vacuum vessel 11 is hermetically closed by welding its entire periphery in airtightness. The final hermetically welded section 28 is fully set apart from input window member 18 and input substrate 12, thereby completing a vacuum vessel without undesirable heating said input window member 18 and input substrate 12 while welding. The cylinder 21 is formed of a metal easily weldable with the Kovar ring 22 and support frame 20 such as nonmagnetic stainless steel or metal material of high magnetic permeability such as permalloy (an alloy consisting of 27% Fe, 5% Mo and Ni as the remainder), other forms of Fe, and iron-containing alloy (Fe material). Support frame 20 may be formed of metal materials the same as those listed above. Preferred is a metal material, for example, SUS 304L which has a sufficiently nonmagnetic or low magnetic property to be little magnetized or deformed by a magnetomotive force when support frame 20 is pressed against input window member 18 by resistive heating based on the later described high pulse current. The input window member 18 is formed of the aforesaid titanium (Ti) or Ti alloy (hereinafter referred to as "Ti material") containing a small amount of, for example, Al, Mo, Cr, Sn, Mn, V alone or in combination.

Figure 2:
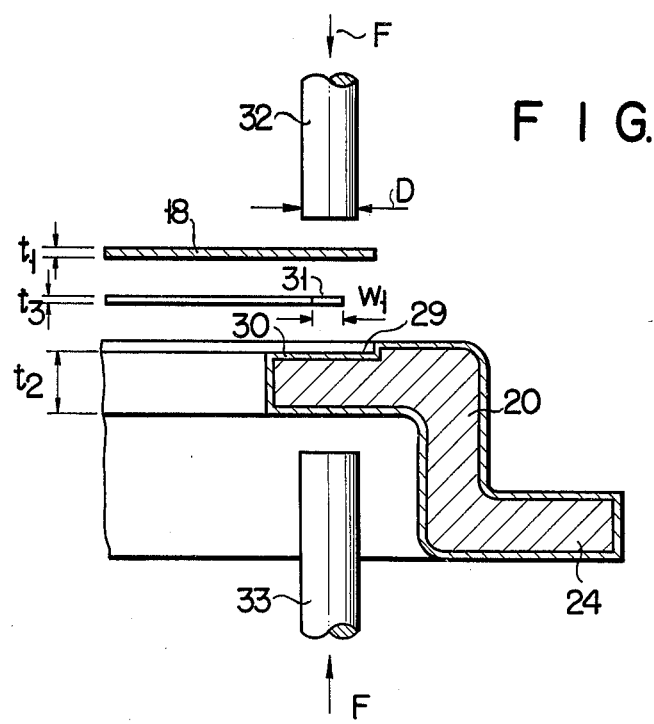
FIG. 2 is an exploded enlarged cross sectional view of the main section of FIG. 1.

Description is now given of the construction of the support frame 20 and input window member 18 of Ti material which are welded together to be sealed hermetically, and the method of manufacturing said assembly. The input window member 18 is formed of a disc sheet of Ti material which has a thickness $t_1$ of 0.1 to 0.4 or preferably 0.25 mm as shown in FIG. 2, and whose surface is fully cleaned. The support frame 20 is formed of an annular member which has a thickness $t_2$ of 1 to 3 mm, or preferably 2 mm and whose peripheral portion is bent with a crank-shaped cross section. There is an annular recess 29 with a depth equal to the thickness $t_1$ of said input window member 18 in the upper portion of the annular support frame 20 which is positioned perpendicular to the axis of the vacuum vessel. The input window member 18 is welded on the annular recess. The whole of support frame 20 is previously plated with a nickel layer 30 with a thickness of 5 to 40 microns or preferably 15 microns. The thin nickel layer 30 may be evaporated to be deposited on support frame 20. A narrow ring-shaped metal foil insert member 31 is sandwiched between the disc-shaped window member 18 and annular support frame 20. The laminated members are placed between a pair of electrodes 32, 33 used for spot welding based on resistive heating. The metal foil insert member 31 is formed of a Cu-alloy comprising Cu and Au or alloy of Cu and Ag whose melting point is lower than the transformation point of the input window member 18 of the Ti material, that is, a temperature at which changes take place in the crystal structure of said Ti material (882° C. in the case of Ti and approximately 800° to 950° C. in the case of a Ti alloy), and higher than a maximum temperature of, for example, about 500° C. which is used during the manufacture of the subject vacuum vessel or at which said product is practically applied. The metal foil insert member 31 may be formed of an alloy of 70-85% Au and 15-30% Cu; 45-80% Au, 3-35% Ag and 8-22% Cu; 60-80% Ag and 20-40% Cu; 40-75% Ag, 10-35% Cu and 3-30% Zn; or any of the above listed alloys which further contains a small amount of any or a mixture of Ni, Cd or Sn. The diameter D of the contact area of that portion of the round rod-shaped electrode 32 which is pressed against the input window member 18 has an important relationship with the width $w_1$ of the ring-shaped metal foil insert member 31 in the sense that introduced current is concentrated on the metal foil insert member 31, thereby enabling that portion of insert member 31 which lies immediately under the electrode 32 to be fully melted across the width $w_1$. The metal foil insert member 31 is chosen to have a thickness $t_3$ of 0.05 to 0.4 mm, or preferably 0.1 to 0.2 mm.

It is possible to preliminarily join the support frame 20 with the metal foil insert member 31 by spot welding the peripheries of both members 20, 31 at 10 to 20 substantially equidistant points, and superpose the input window member 18 on said spot welded support frame 20 and metal foil insert member 31.

Figure 3:
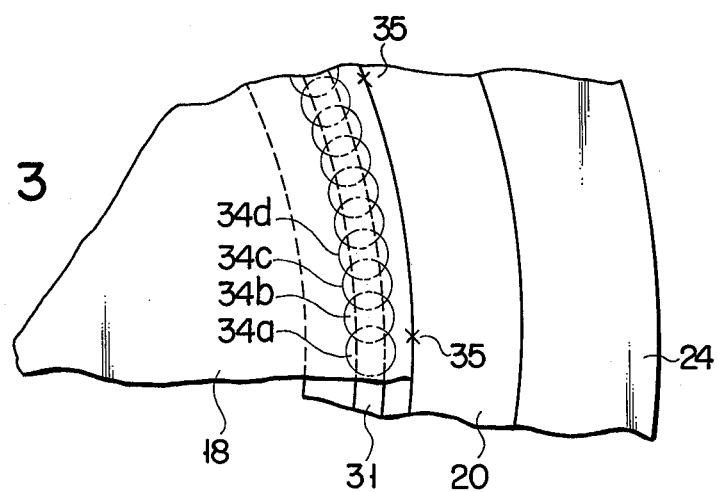
FIG. 3 is an enlarged top view of the main section of FIG. 1.
Figure 4:
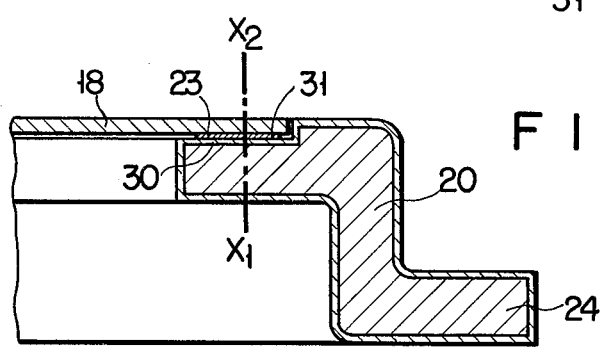
FIG. 4 is an enlarged cross sectional view of the main section of FIG. 1.

After the above-mentioned step, a pressure ranging from about 40 to about 200 kg/cm$^2$ or preferably from 70 to 150 kg/cm$^2$ is applied across the welding electrodes 32, 33 in the direction of an arrow F indicated in FIG. 2 in the air or an atmosphere of inert gas. Under this condition, a pulse current of about 10,000 to about 40,000 A/cm$^2$ (at the peak) is conducted across the welding electrodes 32, 33 to carry out welding. The pulse current is applied to each welding point for 0.5 to 3 seconds at a frequency of 3 to 20 Hz. The above-mentioned pressure and current are intermittently applied by successively shifting the point of application in such a manner that as shown in FIG. 3, the respective welded portions 34a, 34b, 34c, 34d, . . . overlap each other contiguously all along the periphery of the input window member 18. The above-mentioned spot welding is undertaken in such a pitch that the neighboring welded spots overlaps each other ⅔ to ½ in the circumferential plane against which the welding electrodes 32, 33 are pressed. As a result, the metal foil insert member 31 is uniformly melted all along its periphery, assuring fully airtight welding. The above-mentioned welding is carried out with water or air cooling in order to prevent the welding electrodes 32, 33 and window member 18 of the Ti material from being overheated. Further prior to the application of pressure to the welding electrodes 32, 33 and the pulse current pass therethrough for welding, the peripheries of the support frame 20 and input window member 18 between which the metal insert member 31 is interposed are preliminarily joined together by laser or spot welding at points indicated by marks ×(35) in order to suppress the unnecessary displacement of said windowpane 18 and its support frame 20 during the application of pressure and pulse current. As shown in FIG. 4, therefore, the input window member 18 and its support frame 20 are welded together in airtightness through the metal foil insert member 31 and Ni plated member 30 whose peripheries are all melted. The metal foil insert member 31 is melted by resistive heating and has its thickness rendered substantially equal to that of the Ni plated layer 30 due to application of pressure.

According to the above-mentioned welding process of this invention, a thin radiation input window member of the Ti material and a thick support frame of the Fe material are intermittently welded together by resistive heating in airtightness with a metal foil insert member sandwiched therebetween. This metal foil insert member is formed of an alloy mainly consisting of Au or Ag with the remainder composed of Cu and has a lower melting point than the transformation point of the Ti material. Therefore, it is unnecessary to heat the Ti material up to a higher temperature than its transformation point, thereby saving the Ti material from brittleness and deformation. Consequently, a thin radiation input window member of the Ti material can be welded stably with a high industrial efficiency. When fully evacuated or filled with a low pressure gas, the finished vacuum vessel is slightly depressed inward as shown in FIG. 1.

Figure 5:
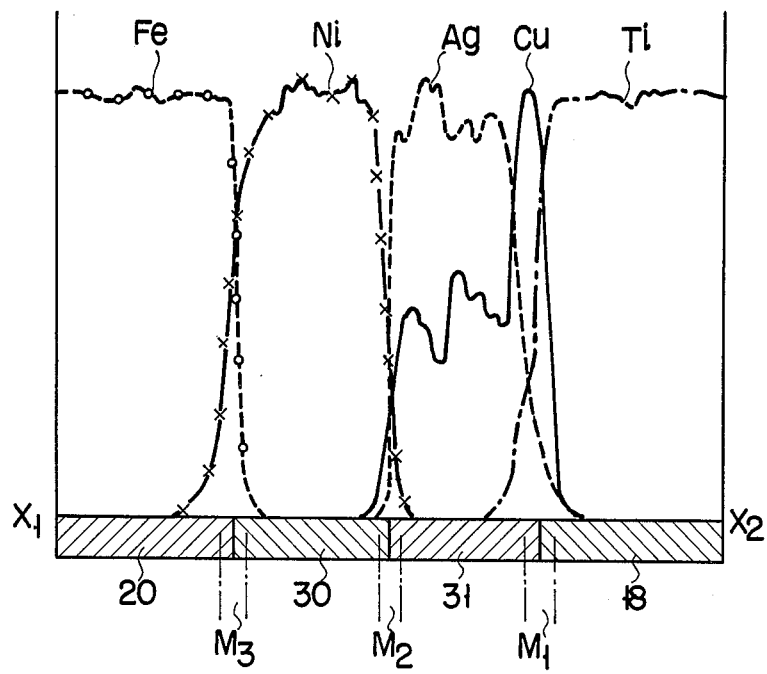
FIG. 5 is a profile of a metal element constituting a welded portion provided by a method according to one embodiment of the invention.

FIG. 5 shows the profiles (measured by an X-ray probe microanalyzer) of the respective metal elements 20, 30, 31, 18 included in the portion $X_1$-$X_2$ welded by the method of this invention which comprises a support frame made of stainless steel sheet plated with Ni with a thickness of about 15 microns, and a metal foil insert member formed of a thin 0.15 mm ring of an alloy (having a melting point of about 720° C.) consisting of 72% Ag and Cu as the remainder. As seen from FIG. 5, Cu included in the metal foil insert member 31 migrates toward the Ti material 18 in a large amount, and a Cu-Ti mutually diffused layer $M_1$ having a thickness of about 2.5 microns is observed. In the plated Ni layer, too, a Ni-Cu mutually diffused layer $M_2$ having a thickness of about one micron is observed. In the metal foil insert member 31, little change takes place in the distribution of Ag. Cu of the metal foil insert member 31 plays a part in producing mainly alloys of Cu-Ti and Ni-Cu. Therefore, it can be inferred from FIG. 5 that good airtight welding has been accomplished. A mutually diffused layer $M_3$ having a thickness of about 1.5 microns is recognized between the support frame 20 and plated Ni layer. It has been confirmed that the above-mentioned satisfactory welded condition originates from the fact that pressure and pulse current can be reliably applied within a relatively broad range. This fact assures the automated quantity production of a vacuum vessel and offers prominent industrial advantages. The welded portion of the vacuum vessel embodying this invention has a sufficiently great mechanical strength demanded of a vacuum vessel, because the Ti material is alloyed only on the surface.

Figure 6:
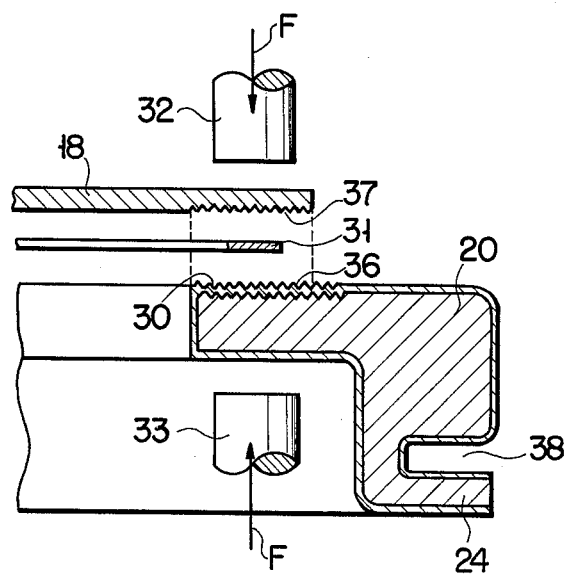
FIG. 6 is an exploded enlarged cross sectional view of a welded portion provided by a method according to another embodiment of the invention.

Description is now given with reference to FIG. 6 of a welded portion of a vacuum vessel provided by a method according to a second embodiment of this invention. Irregular surfaces 36, 37 having fine pits and projections are formed, for example, by sandblasting on the mutually facing places of the support frame 20 and input window member 18. A thin Ni layer 30 is coated on the surface of the support frame 20. The irregular portions 36, 37 are spot welded by resistive heating with a metal foil insert member 31 interposed therebetween. The support frame 20 is increased in thickness as a whole for elevation of its mechanical strength. A groove 38 is formed in said thick support frame 20 to provide a thin flange 24 which is to be arc welded to the body cylinder of the vacuum vessel. With the welding method of FIG. 6 according to the second embodiment of the invention, the metal foil insert member 31 is spot resistance welded to the irregular portions 36, 37, assuring an increased contact area and improved airtight welding. The irregular portions may be formed on either of the mutually facing planes of the support frame 20 and input window member 18.

Figure 7:
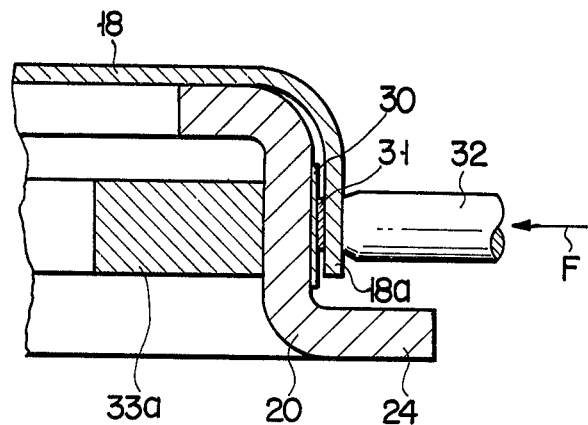
FIG. 7 is an enlarged sectional view of a welded portion provided by a method according to still another embodiment of the invention.

Description is now given with reference to FIG. 7 of a welded portion of a vacuum vessel provided by a method according to a third embodiment of the invention. A Ni layer 30 is plated on the outer surface of an annular support frame 20 having a crank-shaped cross section. The gently bent outer peripheral portion 18a of the input window member 18 of the Ti material is superposed on the plated Ni layer 30 with the metal foil insert member 31 interposed therebetween. The whole periphery is welded around by resistive heating while pressure is applied by a ring-shaped inner electrode 33a and rod-shaped outer electrode 32 and pulse current is introduced through said electrodes 33a, 32. In this case, too, welding is carried out under pressure by resistive heating contiguously all along the peripheries of the input window member 18 and support frame 20 in such a manner that the welded spots overlap each other.

Figure 8:
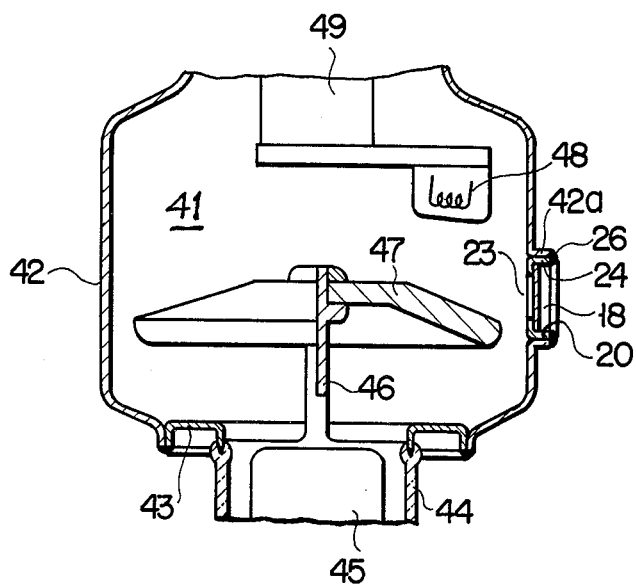
FIG. 8 is a cross sectional view of an X-ray tube provided with a vacuum vessel embodying the invention.
Figure 9:
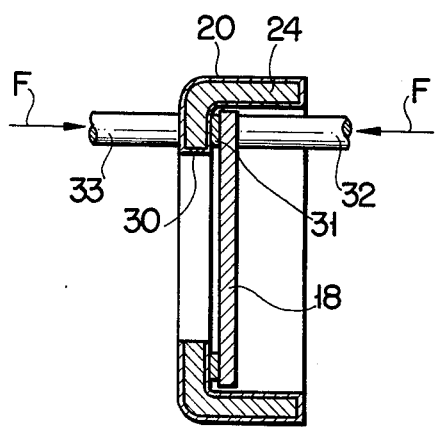
FIG. 9 is an enlarged cross sectional view of the main section of FIG. 8.

FIGS. 8 and 9 show a vacuum vessel according to a fourth embodiment of this invention which is applied to an X-ray tube. The X-ray tube vacuum vessel 41 according to this embodiment comprises a stainless steel cylinder 42 swelling in the center, Kovar ring 43 and glass vessel 44. A cone-shaped anode target 47 is installed in the vacuum vessel, supported by a shaft 46 of a rotor 45. In the vacuum vessel 41 a cathode member 48 and a cathode support member 49 are held in a position facing the cone-shaped anode target 47. An X-ray permeable window member 18 of the Ti material is set in a position facing the electron beam-focusing orbit on the anode target 47. This X-ray permeable window member 18 is welded to the support frame 20 of the Fe material in airtightness as in the preceding embodiments. A thin Ni layer 30 is plated or evaporated on the support frame 20. A metal foil insert member 31 is interposed between window member 18 and support frame 20. While pressure is applied by a pair of electrodes 32, 33, pulse current is applied to weld the entire peripheries of the window member 18 and support frame 20 under pressure by resistive heating. The flange 24 of the support frame 20 with which the window member 18 is previously joined is arc welded to a flange 42a formed on the cylinder 42 in a position indicated by a reference numeral 26.

The X-ray permeable window member 18 is disposed particularly near the electron focusing orbit of the anode target 47 and is directly subject to heat radiation, and further is ready to be overheated due to impingement of secondary or floating electrons. However, the window member 18 of the Ti material which is welded in airtightness to the support frame 20 in accordance with the method of this invention satisfactorily withstands heat and is fully adapted for use with the above-mentioned type of X-ray tube.

With the foregoing embodiments, at least one of the welding electrodes was of the rod type. However, it is possible to use roller-shaped welding electrodes and carry out the so-called seam welding of the peripheries of the window member 18 and support frame 20 under predetermined pressure by passing pulse current. Further it is possible to prepare the support frame 20 from a ring or cylinder of an alloy such as Kovar which is welded to glass or ceramic material, thereby omitting, for example, the body cylinder 21 of the vacuum vessel of FIG. 1.

As described above, this invention enables a radiation-permeable window member of the Ti material to be welded in airtightness to the support frame of the Fe material without raising the temperature of the entire radiation-permeable window member, thereby assuring the easy and reliable manufacture of a vacuum vessel without giving rise to the brittleness and deformation of the window member. Further, the invention allows the materials assuring fully airtight welding and the level of pressure and the magnitude of current for resistive heating to be selected over a relatively broad range and enables the mechanical automation of the process of manufacturing a vacuum vessel, thereby offering prominent industrial advantages.

What we claim is:

1. A method of manufacturing a vacuum vessel, which comprises the steps of:
    superposing a radiation-permeable window member of titanium or alloys thereof, a support frame of iron or alloys thereof and a metal foil insert member having a lower melting point than the transformation point of the window member in such a manner that the metal foil insert member is interposed between the window member and the support frame;
    holding the superposed members between a pair of welding electrodes;
    applying a pressure of 40 to 200 kg/cm$^2$ to the welding electrodes;
    conducting an electric current through said electrodes to heat-melt the insert member at a temperature lower than the transformation point of the window member thereby welding the window member and the support frames together; and
    successively carrying out said welding in such a manner that the adjacent welded portions are in contact with each other contiguously all along the periphery of the window member.

2. The method of manufacturing a vacuum vessel according to claim 1, which comprises the steps of:
    previously depositing a thin nickel layer on at least that portion of the support frame which is to be welded to the window member; and
    welding the window member and the support frame together with the deposited nickel layer and the metal foil insert member interposed between the window member and the support frame.

3. A method according to claim 1,
    wherein said step of conducting an electric current comprises the step of conducting a pulse current of 10,000 to 40,000 A/cm$^2$ (at the peak).

4. The method of manufacturing a vacuum vessel according to claim 1, wherein welding electrodes having a broader width than that of the metal foil insert member are applied in welding the window member and the support frame together by conducting said current through said electrodes.

* * * * *